(12) United States Patent
Wu et al.

(10) Patent No.: US 7,178,549 B2
(45) Date of Patent: Feb. 20, 2007

(54) VALVE COUPLING DEVICE FOR PUMP

(75) Inventors: Scott Wu, No. 6, Lane 176, Wu Fu Road, Wu Feng Hsiang, Taichung Hsien (TW); Chiang-Pei Chen, Ta Li (TW)

(73) Assignee: Scott Wu, Wu Feng Hsiang (TW)

( * ) Notice: Subject to any disclaimer, the term of this patent is extended or adjusted under 35 U.S.C. 154(b) by 200 days.

(21) Appl. No.: 11/052,402

(22) Filed: Feb. 7, 2005

(65) Prior Publication Data

US 2005/0145276 A1 Jul. 7, 2005

Related U.S. Application Data

(63) Continuation-in-part of application No. 10/126,135, filed on Apr. 19, 2002, now abandoned, which is a continuation-in-part of application No. 11/035,820, filed on Jan. 14, 2005.

(51) Int. Cl.
*F16K 15/20* (2006.01)
*F16K 11/14* (2006.01)

(52) U.S. Cl. .................. 137/223; 137/231; 137/625.47

(58) Field of Classification Search ................ 137/223, 137/231, 625.46, 625.47, 607
See application file for complete search history.

(56) References Cited

U.S. PATENT DOCUMENTS

| | | | |
|---|---|---|---|
| 1,198,205 A * | 9/1916 | Engstrom | 137/231 |
| 1,838,166 A | 12/1931 | Wahl | 137/223 |
| 2,344,492 A | 3/1944 | Brubanker | 137/223 |
| 2,474,286 A | 6/1949 | Snyder | 137/625.48 |
| 2,716,998 A | 9/1955 | Knasjo | 137/231 |
| 2,869,573 A | 1/1959 | Stafford | 137/223 |
| 2,880,747 A | 4/1959 | Newcomb | 137/223 |
| 3,044,491 A | 7/1962 | Sangster | 137/625.48 |
| 3,827,635 A | 8/1974 | Krakowski et al. | 137/223 |
| 3,926,205 A * | 12/1975 | Gourlet | 137/223 |
| 3,933,177 A | 1/1976 | Dwyer | 137/223 |
| 4,423,741 A | 1/1984 | Levy | 137/625.48 |
| 4,921,402 A | 5/1990 | Nelson | 137/625.48 |
| 5,638,865 A * | 6/1997 | Wu | 137/625.47 |
| 5,645,100 A * | 7/1997 | Chuang et al. | 137/223 |
| 5,749,392 A * | 5/1998 | Glotin | 137/231 |
| 5,785,076 A | 7/1998 | You | 137/223 |
| 5,819,781 A * | 10/1998 | Wu | 137/231 |
| 5,855,222 A | 1/1999 | Jou | 137/223 |

(Continued)

*Primary Examiner*—John Rivell
(74) *Attorney, Agent, or Firm*—Alan D. Kamrath; Nikolai & Mersereau, P.A.

(57) ABSTRACT

A valve coupling device includes a body having a transverse hole between two ends of the body. A first nozzle is mounted in an end of the body for coupling with a valve. A first chamber and a second chamber are mounted in the other end of the body and both in communication with the transverse hole. A switch member is pivotally extended through the transverse hole of the body. A second nozzle for coupling with a valve of another type is mounted in the switch member and in communication with the second chamber. When the switch member is in a first position, the first chamber is in communication with the first nozzle and the second chamber is blocked. When the switch member is in a second position, the second chamber is in communication with the second nozzle and the first chamber is blocked.

30 Claims, 8 Drawing Sheets

U.S. PATENT DOCUMENTS 5,960,815 A * 10/1999 Wang .......................... 137/231
5,975,109 A * 11/1999 Wu ............................. 137/223
6,102,063 A * 8/2000 Pierce et al. ................. 137/231
6,843,270 B1 * 1/2005 Wang .......................... 137/231

* cited by examiner

VALVE COUPLING DEVICE FOR PUMP

CROSS REFERENCE TO RELATED APPLICATION

This is a continuation-in-part application of U.S. patent application Ser. No. 10/126,135 filed Apr. 19, 2002, which is now abandoned.

BACKGROUND OF THE INVENTION

1. Field of the Invention

The present invention relates to a valve coupling device for a pump. In particular, the present invention relates to a valve coupling device for an air pump that can be used with valves of various types.

2. Description of the Related Art

Taiwan Utility Model Publication No. M251030 discloses a valve coupling device comprising a housing, a push module mounted in the housing, a nozzle, and a lever. An end cap is mounted to an end of the housing. The nozzle is mounted in the housing and located between the push module and the end cap. The nozzle is a tubular member made of a soft material and includes a longitudinal hole into which a needle of the push module extends. The lever is pivotally mounted to the other end of the housing. When the lever is pivoted to an operative position, the push module is pushed against the nozzle and thus deforms the nozzle. The deformed nozzle encloses a valve of an object to be inflated. When a relatively smaller section of the longitudinal hole of the nozzle faces inward, inflation of an object with an American type valve or a French type valve can be carried out. However, in a case that the valve is of German type, the end cap has to be detached for mounting the nozzle in a reverse direction such that the relatively smaller section of the longitudinal hole of the nozzle faces outward. The end cap is then mounted back to the housing for carrying out inflation through the German type valve. The troublesome detachment and re-assembling of the end cap and the nozzle are required again if the next valve to be coupled is not of German type.

SUMMARY OF THE INVENTION

A valve coupling device in accordance with the present invention comprises a body having a first end, a second end, and a transverse hole between the first end and the second end. A first nozzle is mounted in the first end of the body for coupling with a valve of a first type. A compartment is defined in the second end of the body and includes a first chamber and a second chamber. Each of the first chamber and the second chamber is in communication with the transverse hole.

A switch member is pivotally extended through the transverse hole of the body. The switch member includes a first end and a second end and is pivotable between a first position and a second position. The switch member further includes a first cam section and a second cam section. A second nozzle is mounted in the first end of the switch member and in communication with the second chamber. The second nozzle may couple with a valve of a second type different from the first type.

When the switch member is in the first position, the first chamber is in communication with the first nozzle under the action of the first cam section and the second chamber is blocked under the action of the second cam section.

When the switch member is in the second position, the second chamber is in communication with the second nozzle under the action of the second cam section and the first chamber is blocked under the action of the first cam section.

Preferably, the transverse hole is a through-hole.

Preferably, a coupler is mounted in the compartment for coupling with an air pump. The body may further include an end cap fixed to the second end of the body for retaining the coupler in the compartment. The end cap may be threadedly engaged with the second end of the body.

Preferably, the switch member includes a passageway communicated between the second chamber and the second nozzle.

Preferably, the first cam section and the second cam section are smaller than a remaining portion of the switch member in diameter.

Preferably, a valve seat, a needle, and an elastic element are mounted in the first chamber. The needle is biased by the elastic element to press against the valve seat, thereby blocking the first chamber when the switch member is in the second position. The needle is pushed by the first cam section of the switch member away from the valve seat, allowing communication between the first nozzle and the first chamber when the switch member is in the first position. The first cam section includes a lobe for pushing the needle away from the valve seat when the switch member is in the first position. The first cam section includes a peripheral groove communicated between the first nozzle and the first chamber. The valve coupling device further includes a first channel section between the first chamber and the peripheral groove of the first cam section and a second channel section between the peripheral groove of the first cam section and the first nozzle.

Preferably, a needle and an elastic element are mounted in the second chamber. The needle is biased by the elastic element to block the second chamber when the switch member is in the first position. The needle is pushed away by the second cam section of the switch member when the switch member is in the second position, allowing communication between the second nozzle and the second chamber. The second cam section includes a peripheral groove and a radial hole for providing communication between the second chamber and the passageway of the switch member. The second cam section includes a lobe for pushing the needle away when the switch member is in the second position.

Preferably, the lobe of the second cam section has an angular position different from that of the lobe of the first cam section.

The valve coupling device may include a hose having a first end attached to the second end of the body and a second end to which the second nozzle is coupled.

Preferably, a retainer is mounted to the second end of the switch member for preventing the switch member from falling out of the transverse hole of the body. The retainer includes an enlarged section having a diameter greater than that of the transverse hole of the body. The retainer further includes a stem in threading engagement with the switch member.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
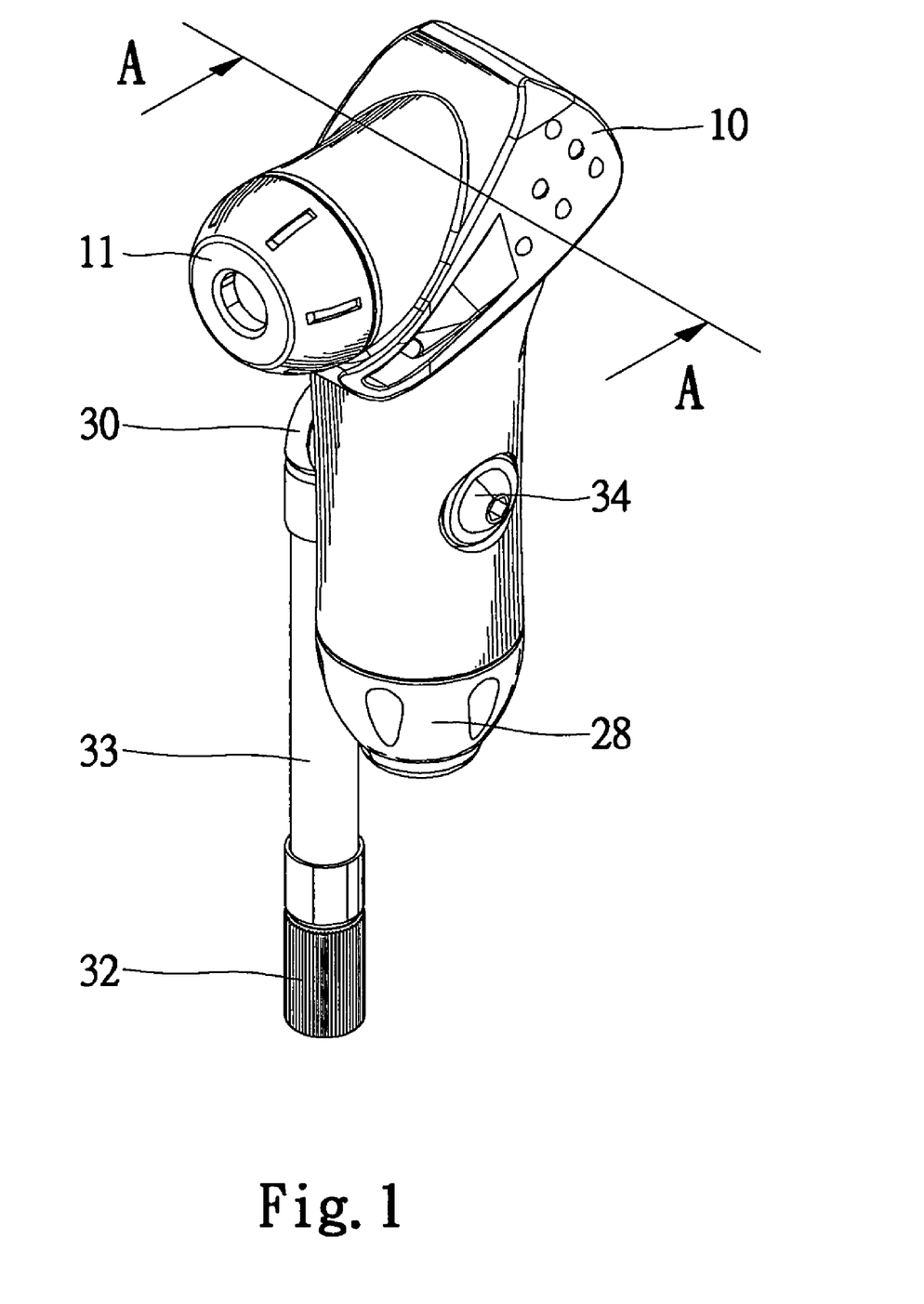
FIG. 1 is a perspective view of a valve coupling device in accordance with the present invention.

Referring to FIG. 1, a valve coupling device in accordance with the present invention comprises a body 10 and a switch member 30. The switch member 30 is mounted to the body 10 and movable between a first position (FIG. 3) and a second position (FIG. 8) relative to the body 10 for use with valves of different types.

Figure 2:
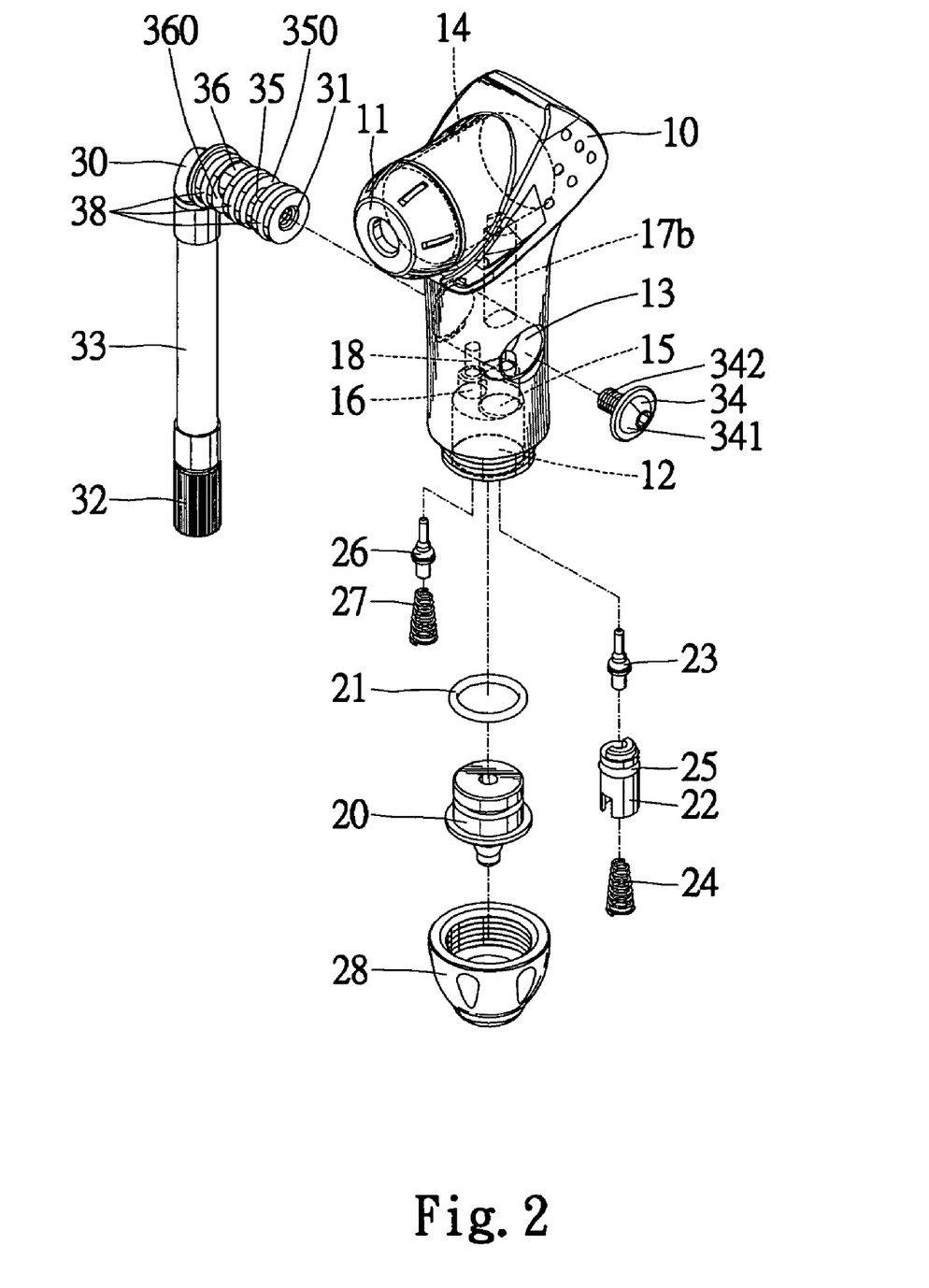
FIG. 2 is an exploded perspective view of the valve coupling device in accordance with the present invention.
Figure 3:
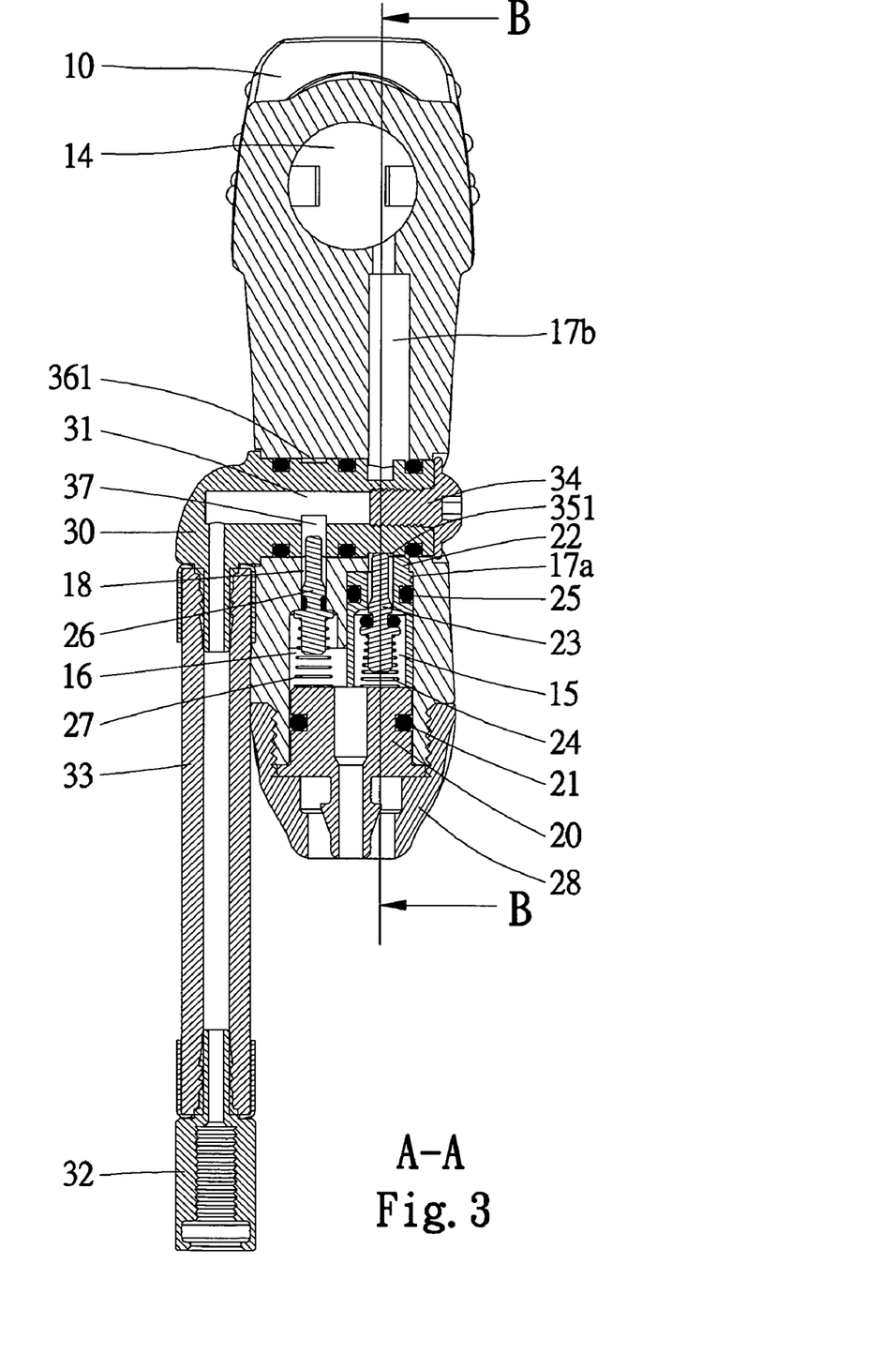
FIG. 3 is a sectional view taken along plane A—A in FIG. 1.
Figure 4:
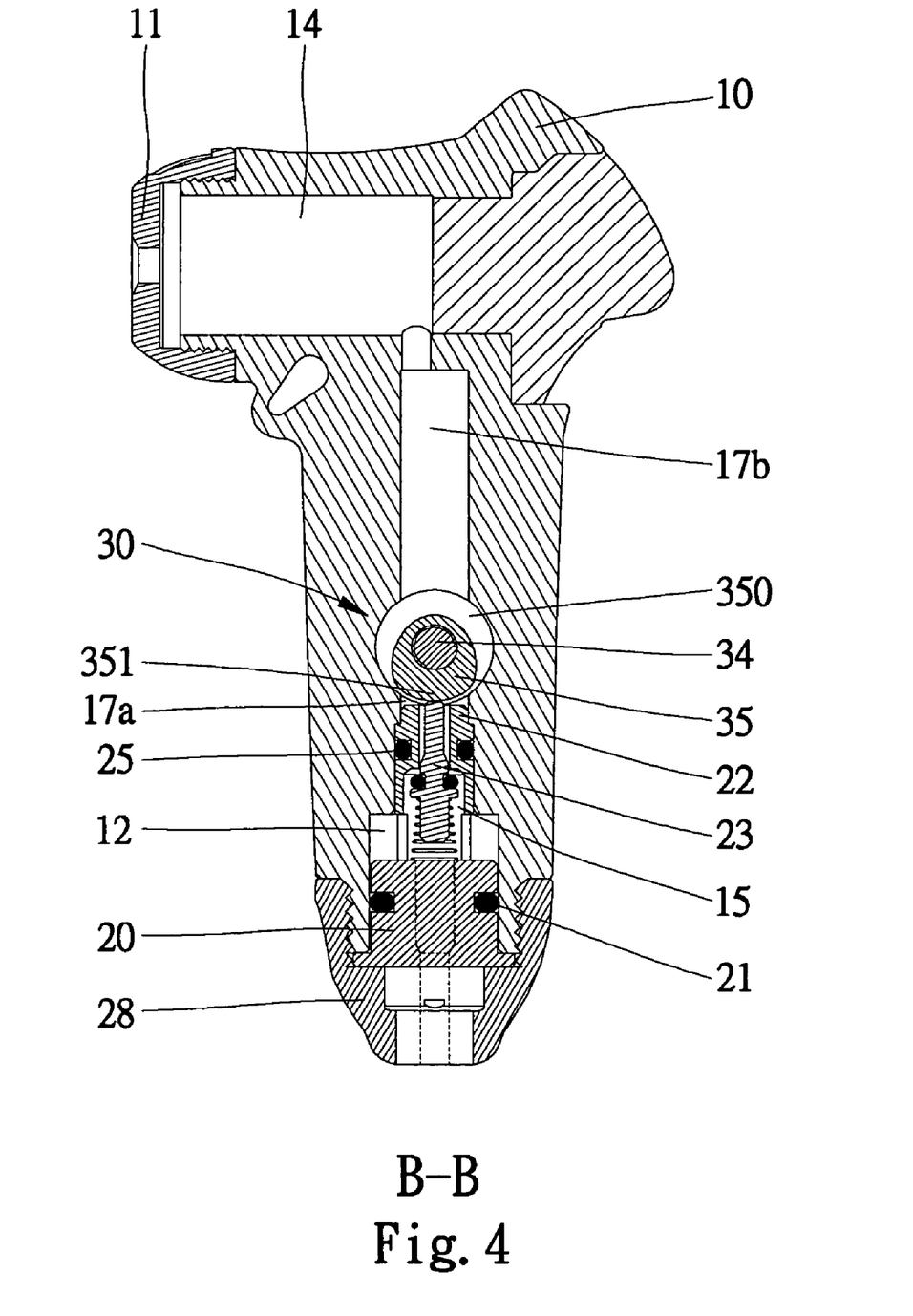
FIG. 4 is a sectional view taken along plane B—B in FIG. 3.

Referring to FIGS. 2 through 4, the body 10 comprises a first end in which a first nozzle 11 is mounted and a second end defining a compartment 12. The first nozzle 11 defines a chamber 14 for receiving air. Preferably, the first nozzle 11 is mounted in a direction transverse to a longitudinal direction of the body 10. The elements mounted in the first nozzle 11 are conventional and therefore not described in detail.

A transverse hole 13 is defined in the body 10 and located between the first end and the second end of the body 10. In the illustrated embodiment, the transverse hole 13 is a through-hole.

The compartment 12 accommodates a coupler 20 for coupling with an air pump or the like. An O-ring 21 is mounted between an outer periphery of the coupler 20 and an inner periphery delimiting the compartment 12 for sealing purposes. An end cap 28 is mounted to the second end of the body 10 for retaining the coupler 20 in the compartment 12. In the illustrated embodiment, the end cap 28 is in threading engagement with the second end of the body 10.

The compartment 12 further includes a first chamber 15 and a second chamber 16. As illustrated in FIG. 2, the second chamber 16 is in communication with the transverse hole 13 via a channel 18. The first chamber 15 is in communication with the chamber 14 in the first nozzle 11 via a channel that extends through the transverse hole 13. In the illustrated embodiment, the channel includes a first section 17a between the transverse hole 13 and the first chamber 15 and a second section 17b between the transverse hole 13 and the chamber 14 in the first nozzle 11.

A valve seat 22, a needle 23, and an elastic element 24 are mounted in the first chamber 15. An O-ring 25 is mounted between an outer periphery of the valve seat 22 and an inner periphery delimiting the first chamber 15 for sealing purposes. The needle 23 is mounted in the valve seat 22 and movable along a longitudinal direction of the valve seat 22. The elastic element 24 is mounted between an end of the needle 23 and the coupler 20 for biasing the needle 23 to a blocking position in which the first chamber 15 is not in communication with the transverse hole 13. Namely, the first channel section 17a is blocked.

A needle 26 and an elastic element 27 are mounted in the second chamber 16. The needle 26 is movable in the second chamber 16 along a longitudinal direction. The elastic element 27 is mounted between the needle 26 and the coupler 20 for biasing the needle 26 to a blocking position in which the second chamber 16 is not in communication with the transverse hole 13. Namely, the channel 18 is blocked.

The switch member 30 is pivotally mounted in the transverse hole 13 of the body 10 and movable between the first position and the second position, as mentioned above. The switch member 30 includes a passageway 31 through which air passes. A hose 33 includes a first end attached to a first end of the switch member 30. The hose 33 further includes a second end to which a second nozzle 32 is coupled. Alternatively, the hose 33 can be omitted, and the second nozzle 32 is directly attached to the first end of the switch member 30. A retainer 34 is mounted to a second end of the switch member 30 for preventing disengagement of the switch member 30 from the transverse hole 13. In the illustrated embodiment, the retainer 34 includes an enlarged head 341 having a diameter greater than that of the transverse hole 13. Preferably, the enlarged head 341 is received in a countersink 130 in the body 10 at a position delimiting an associated end of the transverse hole 13. The retainer 34 includes a stem 342 with an outer threading for threadedly engaging with an inner threading of the second end of the switch member 30. Thus, the switch member 30 may pivotal in the transverse hole 13 of the body 10 without the risk of falling out of the transverse hole 13.

The switch member 30 includes an outer periphery having a first cam section 35 and a second cam section 36 that are smaller than the remaining portion of the switch member 30 in diameter. The first cam section 35 includes a peripheral groove 350 that provides communication between the first channel 17a and the second channel 17b. The second cam section 36 includes a peripheral groove 360 and a radial hole 37 providing communication between the annular groove 360 and the passageway 31 of the switch member 30. Thus, the annular groove 360 and the radial hole 37 provide communication between the channel 18 and the passageway 31 of the switch member 30. Each of the first cam section 35 and the second cam section 360 includes a lobe 351, 361. The lobe 351 of the first cam section 35 and the lobe 361 of the second cam section 36 are different in angular position. In the illustrated embodiment, the angular position difference between the lobe 351 of the first cam section 35 and the lobe 361 of the second cam section 36 is 180 degrees.

A plurality of O-rings 38 are mounted around the switch member 30 to isolate the first cam section 35 and the second cam section 36. Thus, the first cam section 35 is isolated from the second cam section 36, providing required airtight conditions.

Figure 5:
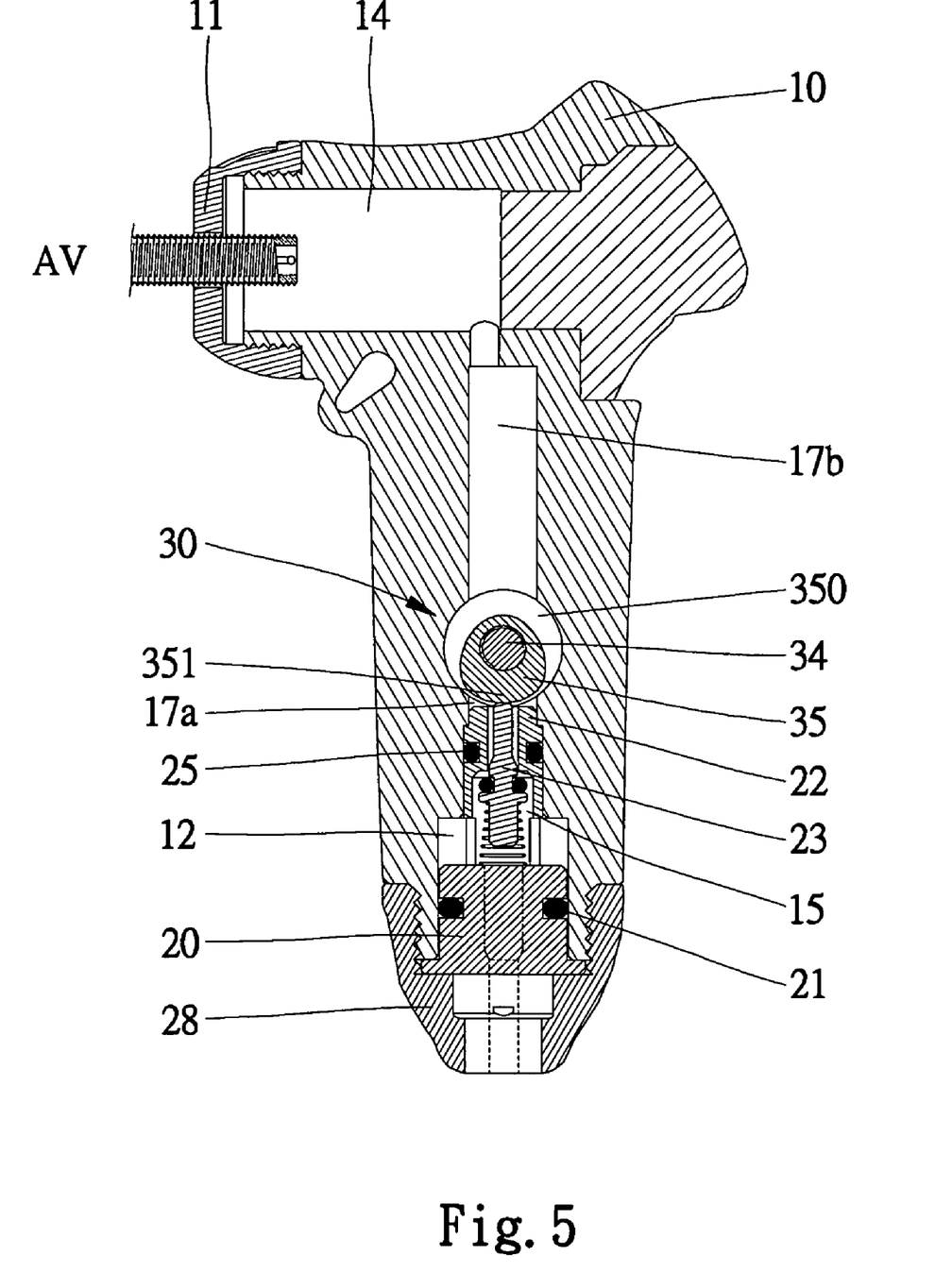
FIG. 5 is a sectional view similar to FIG. 4, illustrating use of the valve coupling device with an American type valve.
Figure 6:
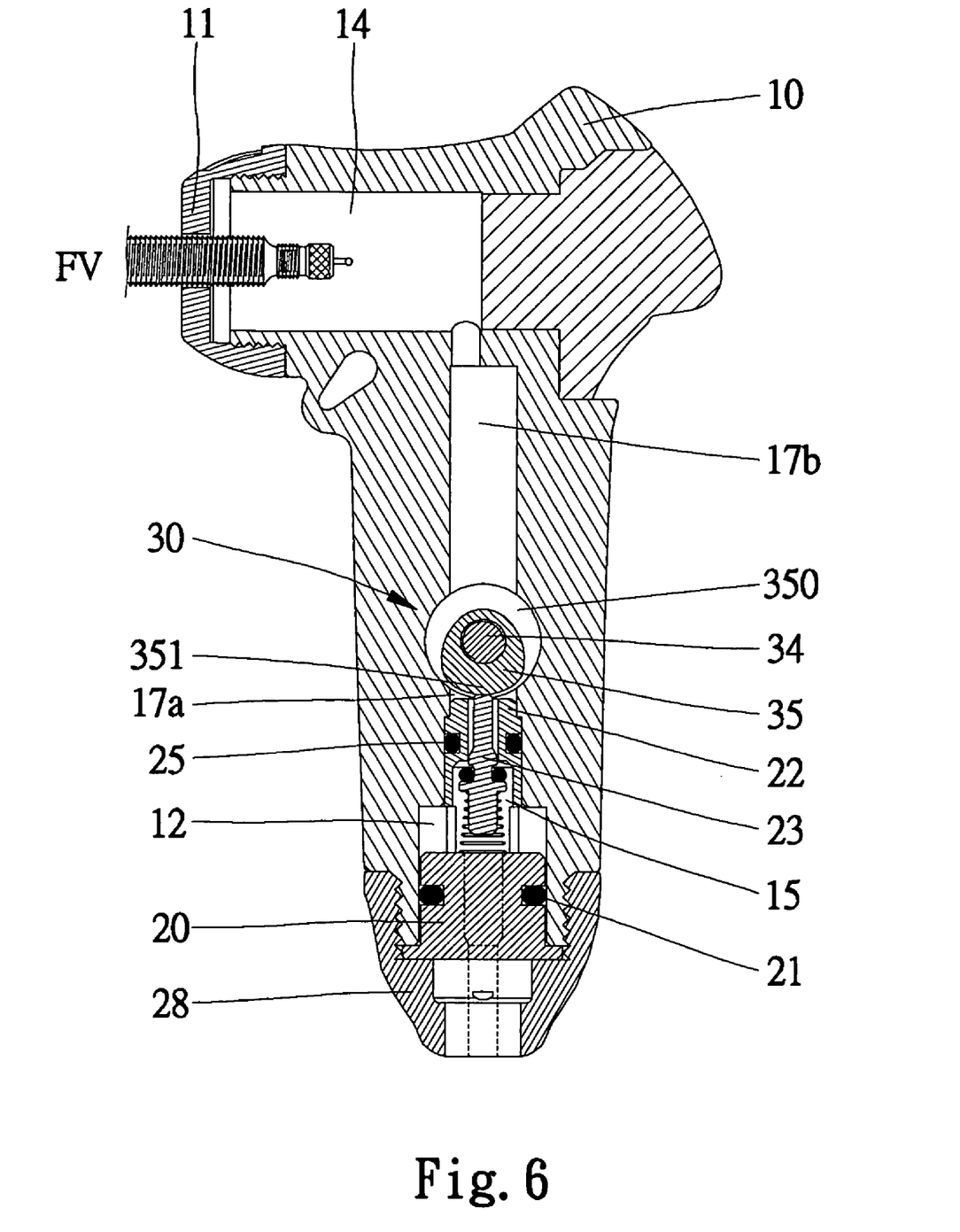
FIG. 6 is a sectional view similar to FIG. 4, illustrating use of the valve coupling device with a French type valve.

When the switch member 30 is in the first position shown in FIGS. 3 and 4, the lobe 351 of the first cam section 35 pushes the needle 23 away from the valve seat 22, providing communication between the first chamber 15 and the first nozzle 11. As illustrated in FIG. 4, air from the air pump or other air source flows through the coupler 20, the first chamber 15, the first channel section 17a, the annular groove 350 of the first cam 35, and the second channel section 17b into the chamber 14 in the first nozzle 11. As illustrated in FIGS. 5 and 6, the first nozzle 11 may be coupled with an American type valve AV or a French type valve FV. Thus, inflation of an object having an American type valve or a French type valve can be carried out. It is noted that the needle 26 in the second chamber 16 is biased by the elastic element 27 to block the channel 18, as shown in FIG. 3. The needle 26 is extended into the peripheral groove 360 of the second cam section 360 under the action of the elastic element 27.

Figure 7:
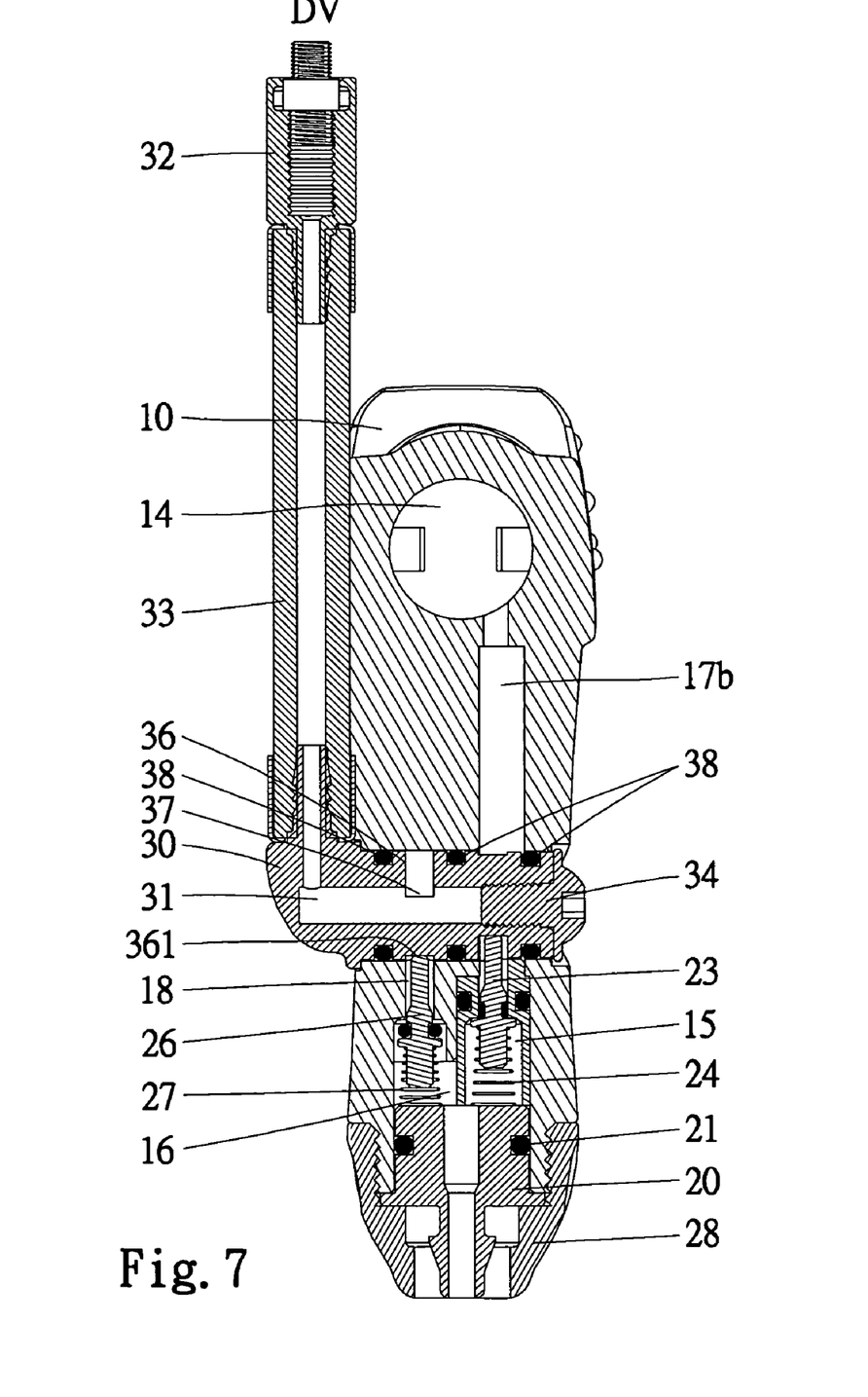
FIG. 7 is a sectional view similar to FIG. 3, wherein a switch handle is moved to a position for coupling with a German type valve.
Figure 8:
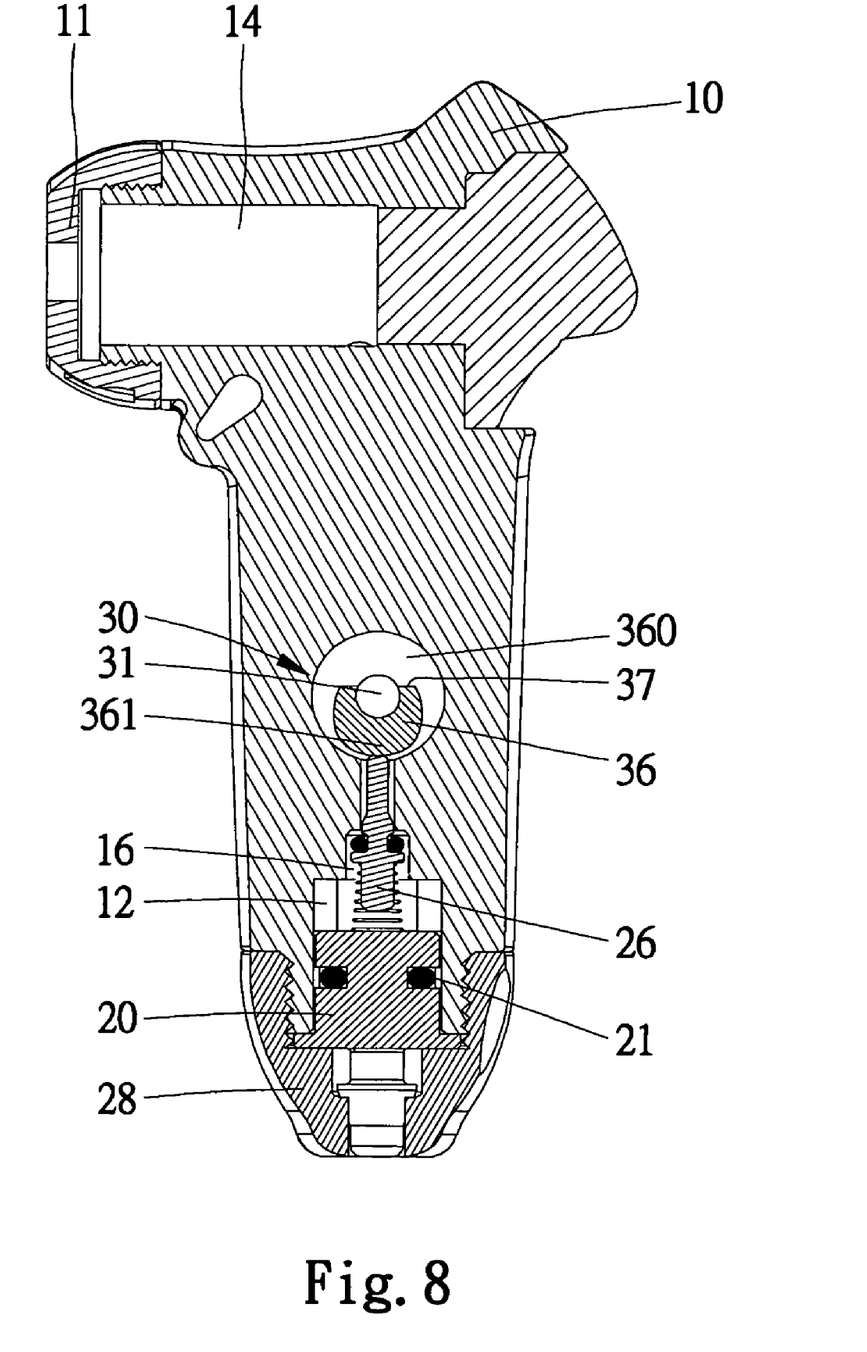
FIG. 8 is a sectional view taken along plane C—C in FIG. 7.

When the switch member 30 is in the second position shown in FIGS. 7 and 8, the lobe 361 of the second cam section 36 pushes the needle 26 in the second chamber 16 away from the transverse hole 13, providing communication between the second chamber 16 and the second nozzle 32. It is noted that the needle 23 in the first chamber 15 is biased by the elastic element 24 to press against the valve seat 22, thereby blocking the channel 17. Air from the air pump or other air source flows through the coupler 20, the second chamber 16, the annular groove 360 of the second cam section 36, and the radial hole 37 of the second cam section 36 into the passageway 31 of the switch member 30, as shown in FIG. 8. Thus, air is supplied to the second nozzle 32 via the hose 33. As illustrated in FIG. 7, the second nozzle 11 can be coupled with a German type valve DV. Thus, inflation of an object having a German type valve DV can be carried out. The second cam section 36 may have other shapes delimiting a radial hole 37 for providing communication between the passageway 31 of the switch member 30 and the peripheral groove 360 of the second cam section 36.

As apparent from the foregoing, the valve coupling device includes two nozzles 11 and 32 for coupling with valves of various types. The switch member 30 can be switched between two different positions for carrying out inflation through a valve of a specific type without troublesome detachment and reassembling procedure.

Although a specific embodiment has been illustrated and described, numerous modifications and variations are still possible without departing from the essence of the invention. The scope of the invention is limited by the accompanying claims.

What is claimed is:

1. A valve coupling device comprising:
    a body including a first end, a second end, and a transverse hole between the first end and the second end, a first nozzle being mounted in the first end of the body, the first nozzle being adapted to couple with a valve of a first type, a compartment being defined in the second end of the body and including a first chamber and a second chamber, the first chamber being in communication with the transverse hole, the second chamber being in communication with the transverse hole;
    a switch member pivotally extending through the transverse hole of the body, the switch member including a first end and a second end and being pivotable between a first position and a second position, the switch member further including a first cam section and a second cam section, a second nozzle being mounted in the first end of the switch member and in communication with the second chamber, the second nozzle being adapted to couple with a valve of a second type different from the first type;
    wherein when the switch member is in the first position, the first chamber is in communication with the first nozzle under the action of the first cam section and the second chamber is blocked under the action of the second cam section; and
    wherein when the switch member is in the second position, the second chamber is in communication with the second nozzle under the action of the second cam section and the first chamber is blocked under the action of the first cam section.

2. The valve coupling device as claimed in claim 1, wherein the transverse hole is a through-hole.

3. The valve coupling device as claimed in claim 1, wherein the valve coupling device further includes a coupler mounted in the compartment for coupling with an air pump.

4. The valve coupling device as claimed in claim 3, wherein the body further includes an end cap fixed to the second end of the body for retaining the coupler in the compartment.

5. The valve coupling device as claimed in claim 4, wherein the end cap is threadedly engaged with the second end of the body.

6. The valve coupling device as claimed in claim 1, wherein the switch member includes a passageway communicated between the second chamber and the second nozzle.

7. The valve coupling device as claimed in claim 6, wherein the first cam section and the second cam section are smaller than a remaining portion of the switch member in diameter.

8. The valve coupling device as claimed in claim 1, wherein:
    the valve coupling device further includes a valve seat, a needle, and an elastic element mounted in the first chamber;
    the needle is biased by the elastic element to press against the valve seat, thereby blocking the first chamber when the switch member is in the second position; and
    the needle is pushed by the first cam section of the switch member away from the valve seat, allowing communication between the first nozzle and the first chamber when the switch member is in the first position.

9. The valve coupling device as claimed in claim 8, wherein the first cam section includes a lobe for pushing the needle away from the valve seat when the switch member is in the first position.

10. The valve coupling device as claimed in claim 9, wherein the first cam section includes a peripheral groove communicated between the first nozzle and the first chamber.

11. The valve coupling device as claimed in claim 10, wherein the valve coupling device further includes a first channel section between the first chamber and the peripheral groove of the first cam section and a second channel section between the peripheral groove of the first cam section and the first nozzle.

12. The valve coupling device as claimed in claim 6, wherein:
    the valve coupling device further comprises a needle and an elastic element mounted in the second chamber;
    the needle is biased by the elastic element to block the second chamber when the switch member is in the first position; and
    the needle is pushed away by the second cam section of the switch member when the switch member is in the second position, allowing communication between the second nozzle and the second chamber.

13. The valve coupling device as claimed in claim 12, wherein the second cam section includes a peripheral groove and a radial hole for providing communication between the second chamber and the passageway of the switch member.

14. The valve coupling device as claimed in claim 13, wherein the second cam section includes a lobe for pushing the needle away when the switch member is in the second position.

15. The valve coupling device as claimed in claim 1, wherein the valve coupling device further includes a hose having a first end attached to the second end of the body and a second end to which the second nozzle is coupled.

16. The valve coupling device as claimed in claim 1, wherein the valve coupling device further includes a retainer mounted to the second end of the switch member for preventing the switch member from falling out of the transverse hole of the body.

17. The valve coupling device as claimed in claim 16, wherein the retainer includes an enlarged section having a diameter greater than that of the transverse hole of the body.

18. The valve coupling device as claimed in claim 17, wherein the retainer further includes a stem in threading engagement with the switch member.

19. The valve coupling device as claimed in claim 6, wherein:
the valve coupling device further includes a valve seat, a first needle, and a first elastic element mounted in the first chamber;
the first needle is biased by the first elastic element to press against the valve seat, thereby blocking the first chamber when the switch member is in the second position; and
the first needle is pushed by the first cam section of the switch member away from the valve seat, allowing communication between the first nozzle and the first chamber when the switch member is in the first position.

20. The valve coupling device as claimed in claim 19, wherein the first cam section includes a lobe for pushing the needle away from the valve seat when the switch member is in the first position.

21. The valve coupling device as claimed in claim 20, wherein the first cam section includes a peripheral groove communicated between the first nozzle and the first chamber.

22. The valve coupling device as claimed in claim 21, wherein the valve coupling device further includes a first channel section between the first chamber and the peripheral groove of the first cam section and a second channel section between the peripheral groove of the first cam section and the first nozzle.

23. The valve coupling device as claimed in claim 22, wherein:
the valve coupling device further comprises a second needle and a second elastic element mounted in the second chamber;
the second needle is biased by the second elastic element to block the second chamber when the switch member is in the first position; and
the second needle is pushed away by the second cam section of the switch member when the switch member is in the second position, allowing communication between the second nozzle and the second chamber.

24. The valve coupling device as claimed in claim 23, wherein the second cam section includes a peripheral groove and a radial hole for providing communication between the second chamber and the passageway of the switch member.

25. The valve coupling device as claimed in claim 24, wherein the second cam section includes a lobe for pushing the needle away when the switch member is in the second position.

26. The valve coupling device as claimed in claim 25, wherein the lobe of the second cam section has an angular position different from that of the lobe of the first cam section.

27. The valve coupling device as claimed in claim 1, wherein the valve coupling device further includes a retainer mounted to the second end of the switch member for preventing the switch member from falling out of the transverse hole of the body.

28. The valve coupling device as claimed in claim 1, wherein the valve coupling device further includes means for isolating the first cam section and the second cam section for airtight purposes.

29. The valve coupling device as claimed in claim 1, wherein the first cam section and the second cam section are smaller than a remaining portion of the switch member in diameter.

30. The valve coupling device as claimed in claim 29, wherein the valve coupling device further includes a retainer mounted to the second end of the switch member for preventing the switch member from falling out of the transverse hole of the body.

* * * * *